United States Patent
Tsuchida

(10) Patent No.: US 10,906,147 B2
(45) Date of Patent: Feb. 2, 2021

(54) MACHINE TOOL AND MACHINE TOOL SYSTEM

(71) Applicant: Okuma Corporation, Niwa-Gun (JP)

(72) Inventor: Koji Tsuchida, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 0 days.

(21) Appl. No.: 15/701,648

(22) Filed: Sep. 12, 2017

(65) Prior Publication Data
US 2018/0111238 A1 Apr. 26, 2018

(30) Foreign Application Priority Data

Oct. 20, 2016 (JP) .................................. 2016-206296
Nov. 16, 2016 (JP) .................................. 2016-223490

(51) Int. Cl.
*B23Q 7/14* (2006.01)
*B23Q 1/48* (2006.01)
(Continued)

(52) U.S. Cl.
CPC .............. *B23Q 7/1463* (2013.01); *B23C 1/08* (2013.01); *B23Q 1/4857* (2013.01); *B23Q 39/048* (2013.01); *B23Q 41/02* (2013.01); *B23Q 1/015* (2013.01); *B23Q 1/28* (2013.01); *B23Q 3/15766* (2013.01); *B23Q 7/1494* (2013.01); *Y10T 29/5124* (2015.01); *Y10T 29/5196* (2015.01); *Y10T 408/5614* (2015.01); *Y10T 409/30532* (2015.01); *Y10T 409/30896* (2015.01);
(Continued)

(58) Field of Classification Search
CPC ........... Y10T 29/5196; Y10T 408/5614; Y10T 408/5616; Y10T 409/305824; Y10T 409/30896; B23Q 1/4852; B23Q 1/4857; B23Q 1/64; B23Q 7/1463; B23Q 39/048
USPC ................ 409/168, 224; 408/89, 90; 29/563
See application file for complete search history.

(56) References Cited

U.S. PATENT DOCUMENTS

| | | | | |
|---|---|---|---|---|
| 8,899,889 B2 * | 12/2014 | Yoshida | ............... | B23Q 1/4857 269/55 |
| 2008/0175684 A1 * | 7/2008 | Schmidt | ................. | B23Q 1/012 409/212 |

(Continued)

FOREIGN PATENT DOCUMENTS

| | | | | |
|---|---|---|---|---|
| CN | 102046327 A | 5/2011 | | |
| DE | 10157404 A1 * | 6/2003 | ............. | B23Q 1/012 |

(Continued)

OTHER PUBLICATIONS

Japanese Office Action (with English translation), Japanese Application No. 2016-223490, dated May 12, 2020 (8 pages).

(Continued)

*Primary Examiner* — Erica E Cadugan
*Assistant Examiner* — Michael Vitale
(74) *Attorney, Agent, or Firm* — Burr & Brown, PLLC

(57) ABSTRACT

A machine tool includes a base, a table, a main spindle, and a trunnion unit. The table is installed on the base. A tool is mounted to the main spindle. The main spindle is caused to approach a workpiece on the table along an up-down direction. The trunnion unit is configured to rotatably hold the table on which the workpiece is placed using a rotation axis along a front-rear direction as a center. The trunnion unit is disposed movable in a right-left direction.

6 Claims, 6 Drawing Sheets

(51) Int. Cl.
  *B23Q 1/01*   (2006.01)
  *B23Q 1/28*   (2006.01)
  *B23Q 39/04*  (2006.01)
  *B23C 1/08*   (2006.01)
  *B23Q 41/02*  (2006.01)
  *B23Q 3/157*  (2006.01)

(52) U.S. Cl.
  CPC ............... *Y10T 409/305264* (2015.01); *Y10T 409/305768* (2015.01); *Y10T 409/305824* (2015.01); *Y10T 409/307168* (2015.01); *Y10T 483/165* (2015.01); *Y10T 483/1795* (2015.01)

(56) References Cited

U.S. PATENT DOCUMENTS

| | | | |
|---|---|---|---|
| 2010/0050419 A1* | 3/2010 | Rabin | B23Q 39/026 29/563 |
| 2010/0320668 A1* | 12/2010 | Takahashi | B23Q 1/66 269/55 |
| 2011/0070044 A1 | 3/2011 | Kawada et al. | |

FOREIGN PATENT DOCUMENTS

| | | | | |
|---|---|---|---|---|
| JP | S61-90840 A | | 5/1986 | |
| JP | 09300151 A | * | 11/1997 | ........... B23Q 1/5437 |
| JP | 2007319951 A | * | 12/2007 | ........... B23Q 1/4852 |
| JP | 5328782 B2 | | 10/2013 | |

OTHER PUBLICATIONS

Chinese Office Action (with English translation), Chinese Application No. 201710976402.9, dated Oct. 7, 2020.

* cited by examiner

MACHINE TOOL AND MACHINE TOOL SYSTEM

BACKGROUND

This application claims the benefit of Japanese Patent Application Numbers 2016-206296 filed on Oct. 20, 2016 and 2016-223490 filed on Nov. 16, 2016, the entirety of which is incorporated by reference.

TECHNICAL FIELD

The disclosure relates to a machine tool for multi-axis processing, such as a machining center, and a machine tool system including the machine tool and peripheral devices.

RELATED ART

When workpiece processing is automated in a machining center, operations of conveying and attaching/removing the workpiece are necessary between machines used in each of steps. These operations of conveying and attaching/removing the workpiece are usually performed by a pallet changer, a loader, or a workpiece loading and unloading device like an articulated or linear-type/rotary-type robot.

As a machine tool including such a workpiece loading and unloading device, Japanese Patent No. 5328782 discloses a machine tool that includes a pallet changing means in one side of a bed that serves as a base. The pallet changing means changes a processed workpiece on a table and an unprocessed workpiece. The machine tool changes a pallet on which the workpiece is placed by rotating a rotary arm of the pallet changing means.

However, when the pallet changer is mounted to a five-axis machine, a necessity of an avoidance operation of one axis that is not required in a horizontal machining center is increased, and therefore, a changing period of the pallet takes long. When processing is performed on all surfaces of the workpiece, even the five-axis machine cannot perform processing on an installation surface of the workpiece with the table. Therefore, the workpiece has to be inverted with the workpiece loading and unloading device. However, when an inverting mechanism is mounted in the workpiece loading and unloading device, a driving device of the inverting mechanism has to be small, thereby leading to a failure of a slow inverting operation. In addition, the machine tool in Japanese Patent No. 5328782 includes a large-scaled pallet changing means. Therefore, an access can be made only from a certain direction, thereby leading to a failure of a limited layout for installation.

It is an object of the disclosure to provide a machine tool having excellent convenience that solves the problems that a conventional machine tool, such as Japanese Patent No. 5328782, has and is configured to change a workpiece already processed and a workpiece to be processed next in a short period and perform processing on an installation surface of the workpiece with the table. It is also an object of the disclosure to provide a machine tool system including such a machine tool.

SUMMARY

In order to achieve the above-described object, there is provided a machine tool according to a first aspect of the disclosure. The machine tool includes a base, a table, a main spindle, and a trunnion unit. The table is installed on the base. A tool is mounted to the main spindle. The main spindle is caused to approach a workpiece on the table along an up-down direction. The trunnion unit may be configured to rotatably hold the table using a rotation axis along a front-rear direction as a center. On the table, the workpiece is placed. The trunnion unit may be disposed movable in a right-left direction.

It is preferable that the main spindle approaches in the up-down direction, based on a distal end of the tool, operatable in a range in which a lower end is below a center of the rotation axis of the trunnion unit in the front-rear direction and an upper end is above a top surface of the workpiece.

It is preferable that the trunnion unit has a moving range in the right-left direction that exceeds a distance from a top surface of the table to a top surface of the workpiece.

It is preferable that the machine tool is configured such that in a state where the workpiece is positioned above the table, the top surface of the workpiece is above a center position of the rotation axis in the front-rear direction.

It is preferable that the machine tool is configured such that in a state where the workpiece is positioned above the table, a top surface of the table is configured to be above a center position of the rotation axis in the front-rear direction.

The machine tool system according to a second aspect of the disclosure may include a workpiece loading and unloading device configured to deliver a workpiece to a table and/or receive the workpiece from the table. The workpiece loading and unloading device may be arranged in any one side or both sides of a right and left and/or a front of the machine tool according to the first aspect.

The machine tool system according to a third aspect of the disclosure includes at least two machine tools according to the first aspect that are arranged. A sum of a distance from a center of a rotation axis of one of the machine tools in a front-rear direction to a top surface of a workpiece ("$N_1$" in FIG. 4) and a distance from a center of a rotation axis of another machine tool in the front-rear direction to a top surface of a table ("$N_2-H$ (height of the workpiece)" in FIG. 4) may be configured so as to be equal to or less than a distance between a center position of the rotation axis in the front-rear direction when a trunnion unit of the one of the machine tools is positioned at a right end and a center position of the rotation axis in the front-rear direction when a trunnion unit of the other machine tool is positioned at a left end ("L" in FIG. 5) (that is, configured to be $L \leq N_1 + N_2 - H$).

The machine tool system according to a fourth aspect of the disclosure includes at least two machine tools according to the first aspect that are arranged. A sum of a distance from a center position of a rotation axis in a front-rear direction when a trunnion unit of one of the machine tools is positioned to a right end to a right end of the one of the machine tools ("F" in FIG. 4), a distance from a center position of a rotation axis in the front-rear direction when a trunnion unit of another machine tool is positioned to a left end to a left end of the other machine tool (E), and a distance between the one of the machine tools and the other machine tool ("K" in FIG. 5) may be configured so as to be equal to or less than a distance between the center position of the rotation axis in the front-rear direction when the trunnion unit of the one of the machine tools is positioned at the right end and the center position of the rotation axis in the front-rear direction when the trunnion unit of the other machine tool is positioned at the left end ("L" in FIG. 5) (that is, configured to be $F+E+K \leq L$).

With the machine tool according to the embodiment, a stroke to cause the workpiece loading and unloading device to access to the table to place the workpiece on can be shortened, thereby ensuring changing the workpiece in a considerably short period. When similar machine tools are disposed on the right and left, the workpiece is delivered to an adjacent machine tool. Therefore, steps can be divided by the machine tool, thereby ensuring shortening a processing period per one step. Moreover, the workpiece can be inverted in a short period to ensure easily performing processing on the installation surface of the workpiece with the table.

The machine tool systems according to the second to fourth aspects cause the loading and unloading devices to simultaneously access from two directions among the right and left and the front of the machine tool for changing the workpiece in an extremely short period, thereby ensuring the substantially short processing period of the workpiece.

DETAILED DESCRIPTION

Figure 1A:
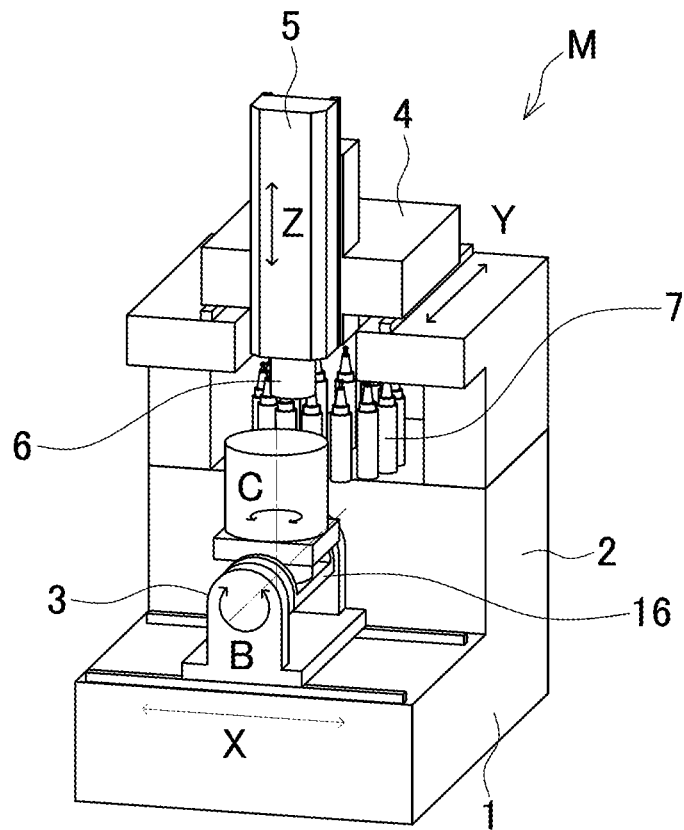
FIGS. 1A and 1B are explanatory views illustrating a machine tool and a machine tool system (FIG. 1A is a perspective view of the machine tool and FIG. 1B is a plan view of the machine tool system).
Figure 1B:
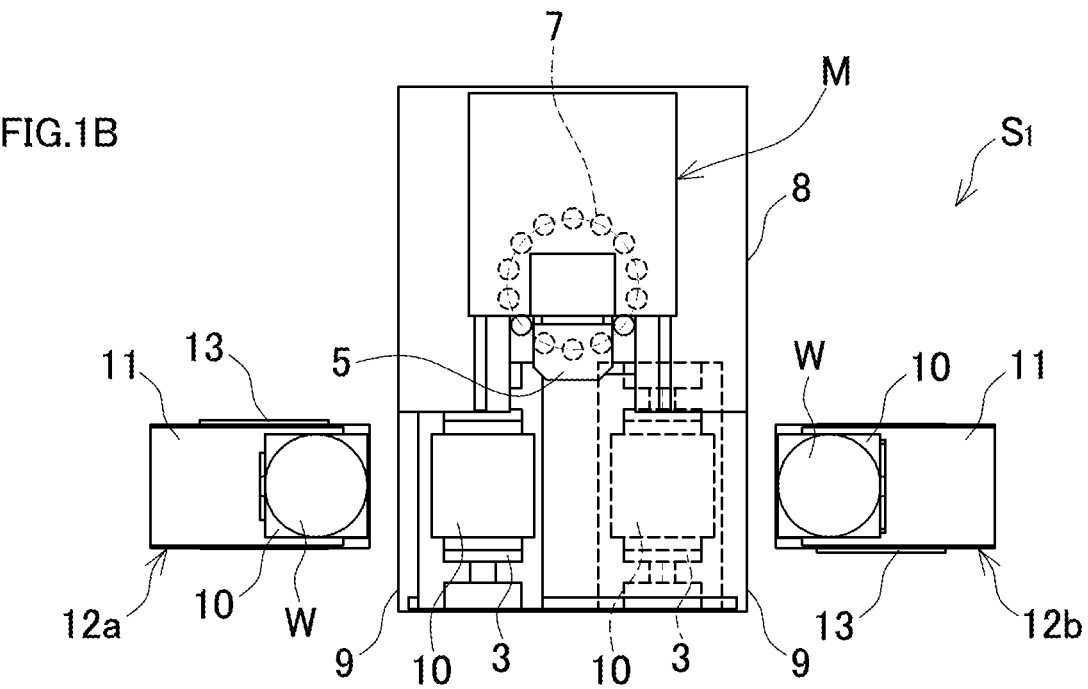

The following describes one embodiment of a machine tool and a machine tool system according to the disclosure in details based on drawings. FIGS. 1A and 1B illustrate a machine tool and a machine tool system using the machine tool according to the disclosure. FIGS. 2A to 2D illustrate operation contents of the machine tool system. A machine tool system $S_1$ is constituted of a machine tool M, a cover 8 covering the machine tool M, and two workpiece loading and unloading devices 12a, 12b installed in a peripheral area of the machine tool M (the two workpiece loading and unloading devices 12a, 12b have identical structures).

In the machine tool M, a bed 1 that serves as a base is disposed to be in a rectangular parallelepiped shape. In a back side of the bed 1, a column 2 in a vertically-elongated rectangular parallelepiped shape is consecutively installed. Furthermore, in a front of the column 2, a trunnion unit 3 in an approximately U-shape from a side view is disposed movable along an X-axis direction, which is a right-left direction. In the trunnion unit 3, a cradle 16 is disposed rotatable in a B-axis direction. The B-axis direction is a rotation axis using a Y-axis, which runs in a front-rear direction, as a center. On a top surface of the cradle 16, a table 10 in a flat rectangular parallelepiped shape is mounted rotatable in a C-axis direction, which is a rotation axis perpendicular to the B-axis, and attachable/removable (the table 10 is configured to attach and remove a workpiece with a jig and a gripping mechanism (not illustrated)). On the column 2, a saddle 4 in a flat rectangular parallelepiped shape is disposed movable along the Y-axis direction. Furthermore, in a front end of the saddle 4, a main spindle head 5 in a vertically-elongated columnar shape is mounted movable along a Z-axis, which runs in an up-down direction. In a lower end of the main spindle head 5, a main spindle 6 to which a tool is mountable is disposed rotatable using the Z-axis as a center.

In addition, below the saddle 4, a tool changer 7 including a clipper-type tool magazine is disposed. The tool changer 7 is in a state where a plurality of tools are mounted in a horizontal circumference shape. Then, the tool changer 7 is configured to automatically change a tool to be mounted to a distal end of the main spindle 6.

The machine tool M configured as described above is in a state where an outer periphery of the machine tool M is covered with the cover 8 in a rectangular parallelepiped shape formed of a transparent synthetic resin plate or similar material. In the cover 8, access doors 9, 9 are installed. These access doors 9, 9 are configured to open and close as necessary. Then, the respective workpiece loading and unloading devices 12a, 12b are installed on both right and left sides of the cover 8 (installed so as to be adjacent to the access doors 9, 9). Each of the workpiece loading and unloading devices 12a, 12b includes a sliding base 11 in an approximately rectangular parallelepiped shape slidable with respect to a base 13. In a distal end of the sliding base 11, the table 10 on which a workpiece W is placed can be gripped. The right and left workpiece loading and unloading devices 12a, 12b are in a state where a moving direction of the sliding bases 11 conforms to the right-left direction (the X-axis direction) of the machine tool M.

Figure 2A:
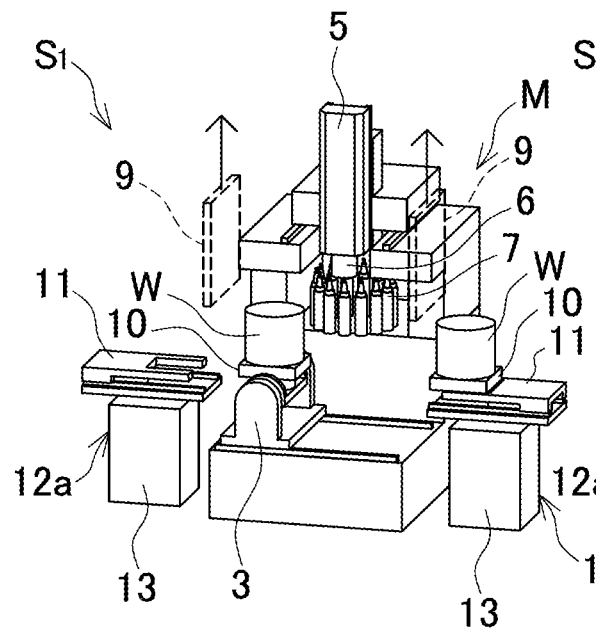
FIGS. 2A to 2D are explanatory views (perspective views) illustrating operation contents of the machine tool system.
Figure 2B:
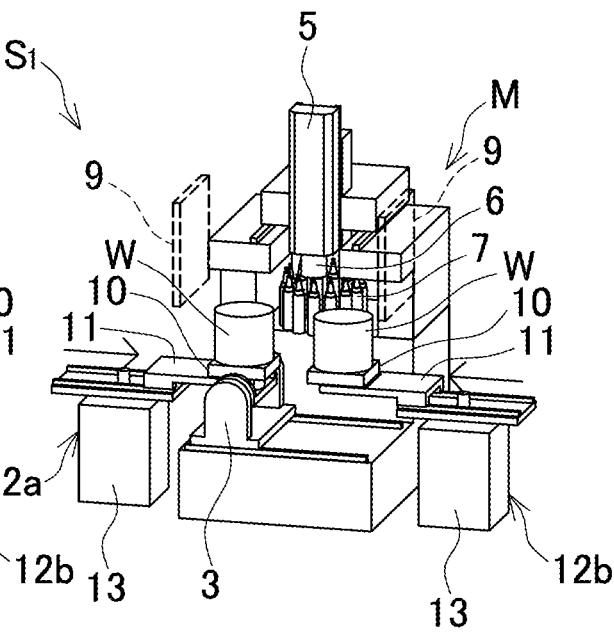
Figure 2C:
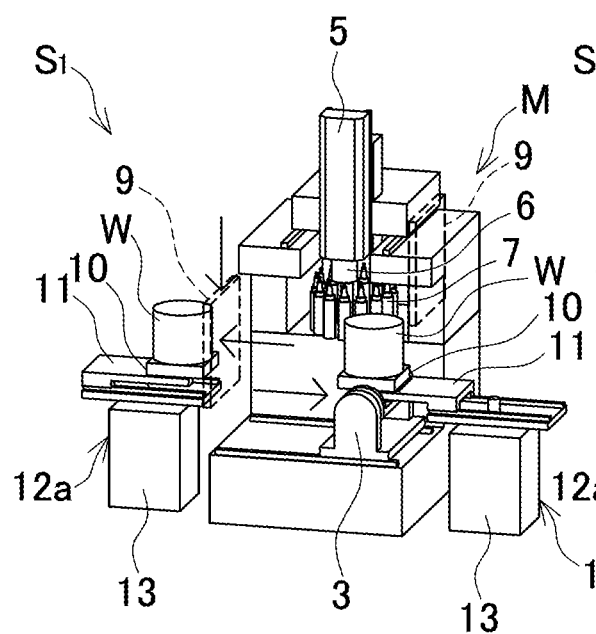
Figure 2D:
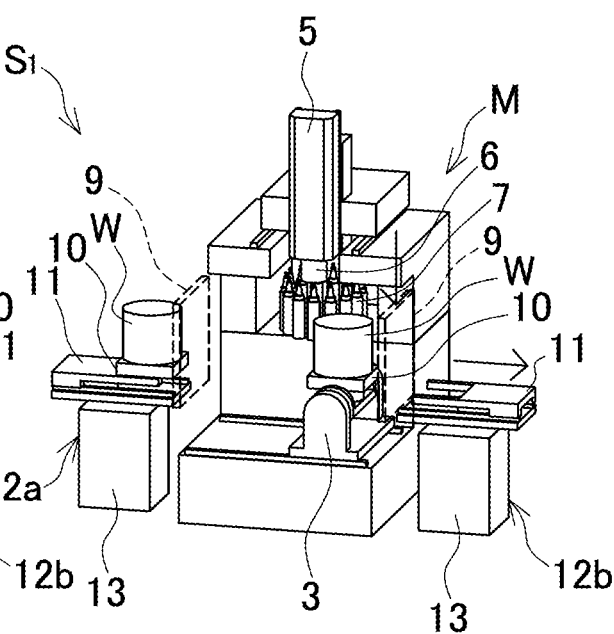

In the machine tool system $S_1$ configured as described above, when the workpiece W that is already processed is changed with the workpiece W that is to be processed next, as illustrated in FIGS. 2A to 2D, the right and left access doors 9, 9 of the cover 8 are simultaneously opened (FIG. 2A). Subsequently, the right and left workpiece loading and unloading devices 12a, 12b are both caused to access to the machine tool M. That is, the workpiece loading and unloading device 12a on a left side causes the sliding base 11 on which the table 10 is not mounted to approach the trunnion unit 3 of the machine tool M to receive the already-processed workpiece W all together with the table 10. The sliding base 11 grips the table 10 (FIG. 2B). Subsequently, the workpiece loading and unloading device 12b on a right side causes the sliding base 11 gripping the table 10 on which the next-to-be-processed workpiece W is placed to approach the trunnion unit 3 of the machine tool M to deliver the next-to-be-processed workpiece W all together with the table 10 (FIG. 2C). Then, the access doors 9, 9 are closed, and processing of the workpiece W on the table 10 starts (FIG. 2D). Thus, in the machine tool system $S_1$, the two workpiece loading and unloading devices 12a, 12b can simultaneously access from the right and left to the table 10 of the trunnion unit 3 that performs processing. Therefore, the already-processed workpiece W can be changed with the next-to-be-processed workpiece W in an extremely short period of time.

Figure 3A:
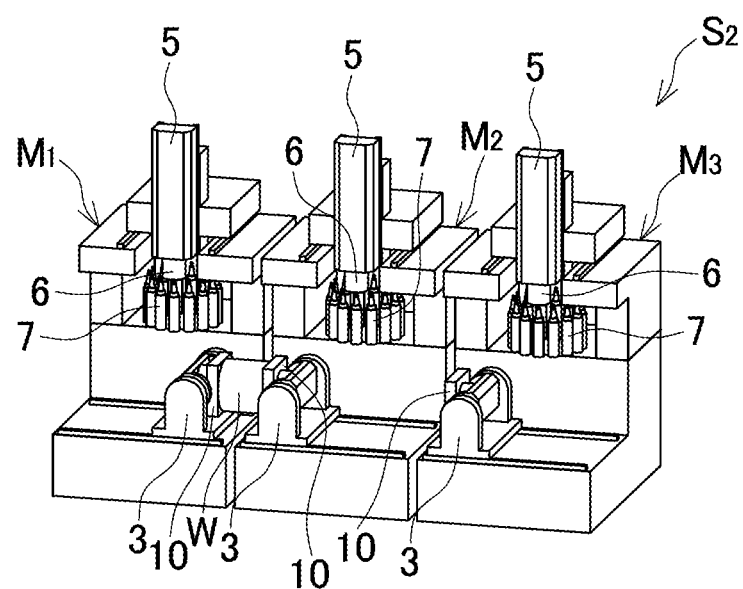
FIGS. 3A to 3C are explanatory views (perspective views) illustrating operation contents of the machine tool system.
Figure 3B:
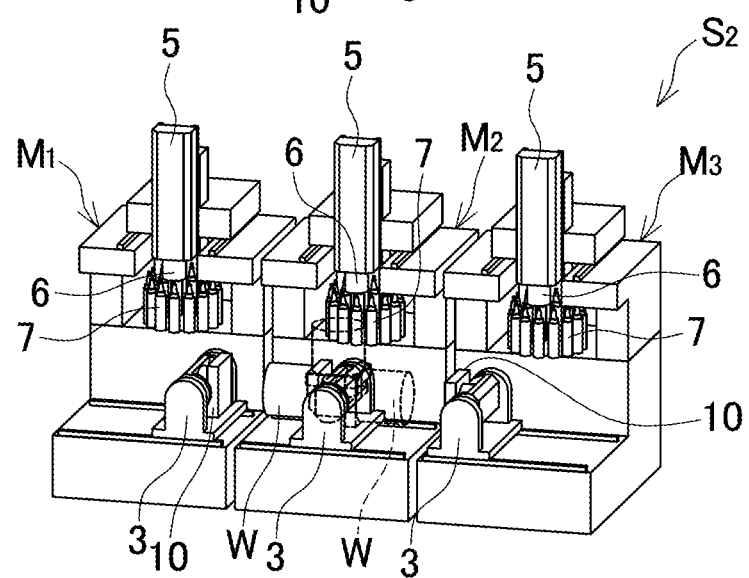
Figure 3C:
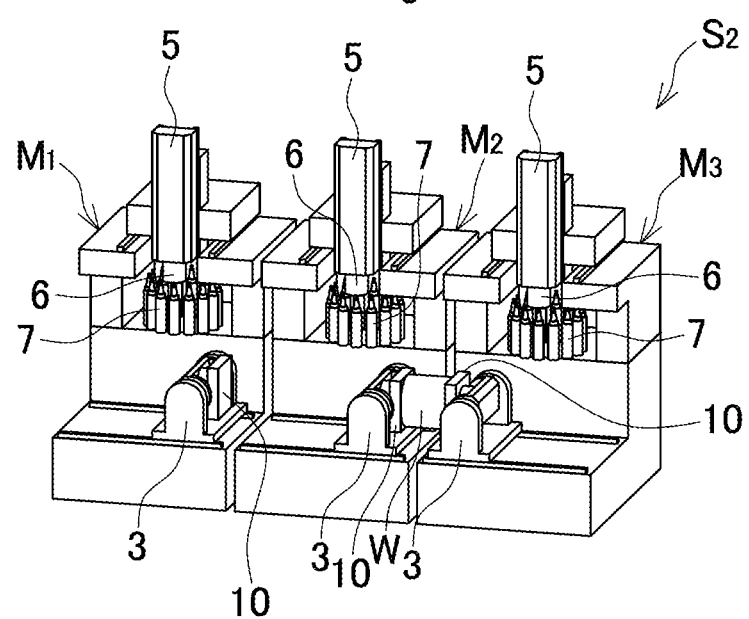

FIGS. 3A to 3C illustrate a machine tool system $S_2$ constituted by arranging a plurality of machine tools $M_1$, $M_2$, $M_3$ in the right-left direction so as to be adjacent to one another with narrow intervals (the machine tools $M_1$, $M_2$, $M_3$ have structures identical to the above-described machine tool M). In the machine tool system $S_2$, when delivery/reception of the workpiece W is performed, first, in the machine tool $M_1$ on the left side, the cradle 16 is turned by 90 degrees to the right in the B-axis direction after the workpiece W is processed. By turning the cradle 16 by 90 degrees to the right, the table 10 on which the already-processed workpiece W is placed is turned to the right and a top surface of the table 10 is caused to face the right side. Simultaneously with this, the trunnion unit 3 is slid rightward to approach the machine tool $M_2$ in a center. Simultaneously with sliding the trunnion unit 3 of the machine tool $M_1$ on the left side rightward, in the machine tool $M_2$ in the center, the cradle 16 is turned by 90 degrees to the left in the B-axis direction. By turning the cradle 16 by 90 degrees to the left, the table 10 on which the workpiece W is not placed is turned to the left and a top surface of the table 10 is caused to face the left side. Together with this, the trunnion unit 3 is slid leftward to approach the machine tool $M_1$ on the left side. Then, in a state where the table 10 of the machine tool $M_1$ on the left side and the table 10 of the machine tool $M_2$ in the center are brought close, the machine tool $M_2$ in the center receives the already-processed workpiece W (a semi-processed goods) from the table 10 of the machine tool $M_1$ on the left side (FIG. 3A).

The machine tool $M_2$ in the center receiving the workpiece W from the machine tool $M_1$ on the left side can perform processing with the tool that is caused to approach the workpiece W from a direction different from the machine tool $M_1$ on the left side. That is, an installation surface of the workpiece with the table 10 in the machine tool $M_1$ can be processed (FIG. 3B). Then, after the workpiece W is processed in the machine tool $M_2$ in the center, by turning the cradle 16 to the right in the B-axis direction, the table 10 on which the workpiece W is placed is turned to the right and the top surface of the table 10 is caused to face rightward. At the same time, the trunnion unit 3 is slid rightward to approach the machine tool $M_3$ on the right side. Simultaneously with sliding the trunnion unit 3 of the machine tool $M_2$ in the center rightward, in the machine tool $M_3$ on the right side, by turning the cradle 16 to the left in the B-axis direction, the table 10 on which the workpiece W is not placed is turned to the left and a top surface of the table 10 is caused to face the left side. Together with this, the trunnion unit 3 is slid leftward to approach the machine tool $M_2$ in the center. Then, in a state where the table 10 of the machine tool $M_2$ in the center and the table 10 of the machine tool $M_3$ on the right side are brought close, the machine tool $M_3$ on the right side receives the workpiece W (the semi-processed goods) from the table 10 of the machine tool $M_2$ in the center (FIG. 3C). The machine tool $M_3$ on the right side receiving the workpiece W from the machine tool $M_2$ in the center can perform processing with the tool that is caused to approach the workpiece W from a direction different from the machine tool $M_2$ in the center. In such a machine tool system $S_2$, processing steps can be divided by the respective machine tools $M_1$, $M_2$, $M_3$ on the left side, in the center, and on the right side, thereby ensuring shortening a processing period per one step.

Figure 4:
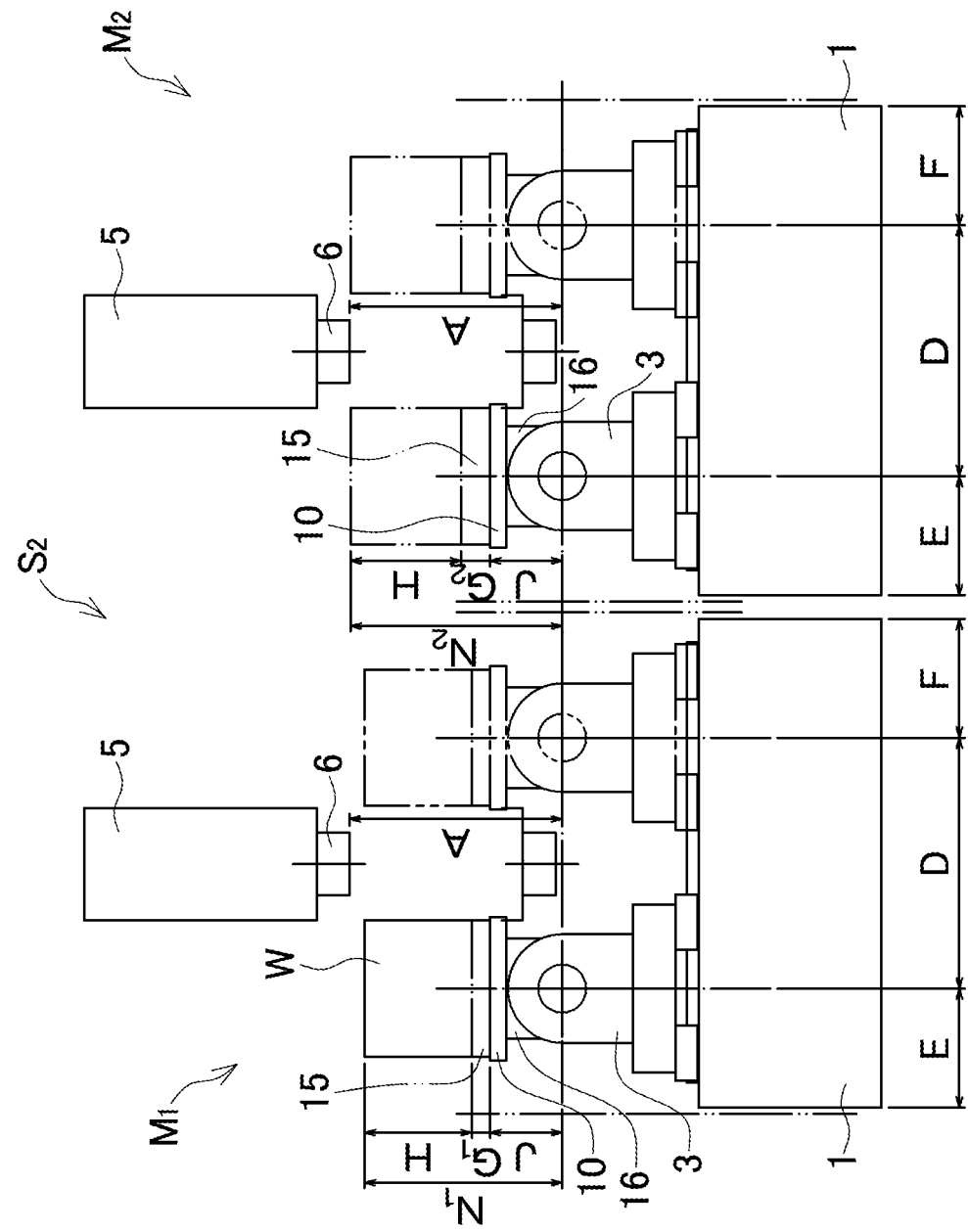
FIG. 4 is an explanatory view (a front view) illustrating details of a configuration of the machine tool.
Figure 5:
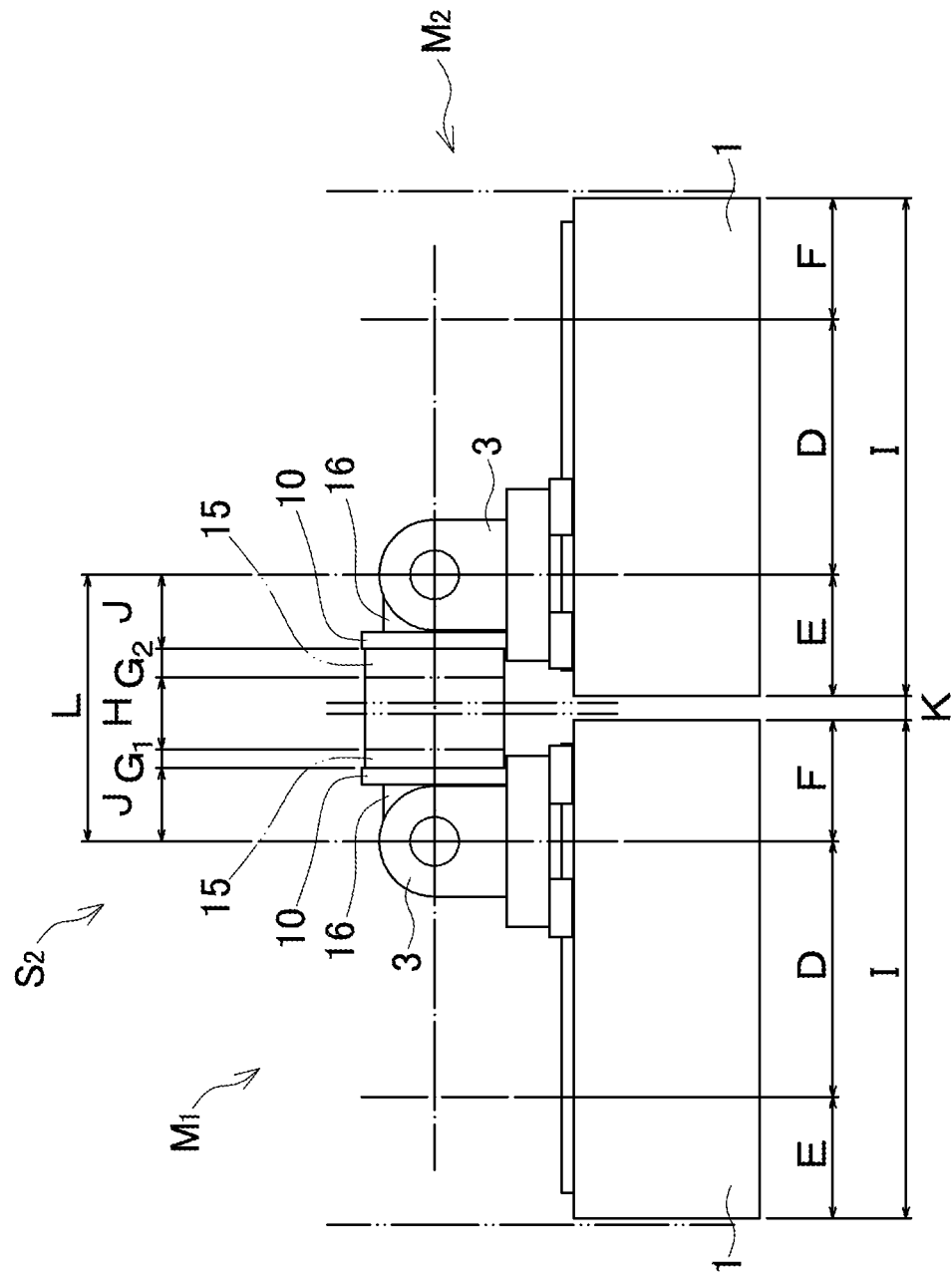
FIG. 5 is an explanatory view (a front view) illustrating details of a configuration of the machine tool.

Next, a preferred configuration of the machine tool that achieves directly delivering the workpiece W between each of the machine tools in the machine tool system $S_2$ illustrated in FIGS. 3A to 3C will be described in details with reference to FIGS. 4 and 5. FIG. 4 is a front view illustrating a configuration of the two adjacent machine tools $M_1$, $M_2$ among the machine tools of the machine tool system $S_2$. FIG. 5 is a front view illustrating a state where the workpiece W is delivered. For a configuration similar to the above, an identical reference numeral is attached to omit the explanation. Here, the workpiece W is placed on the table 10 via a jig 15. The description will be made on the assumption that thicknesses of the jigs 15 in the machine tools $M_1$, $M_2$ are each different (a thickness of the jig in the machine tool $M_1$ is $G_1$ and a thickness of the jig in the machine tool $M_2$ is $G_2$).

The main spindle heads 5 of the machine tools $M_1$, $M_2$ have operating ranges A in the Z-axis direction, which is the up-down direction. The operating range A is based on a distal end of the tool (not illustrated) mounted to the main spindle 6 that is rotatably disposed in the main spindle head 5. The operating range A is from a center of the rotation axis (a lower end) of the trunnion unit 3 to a top surface (an upper end) of the workpiece W placed on the table 10 via the jig 15. That is, in the machine tool $M_1$, the operating range A is $N_1$ or more, and in the machine tool $M_2$, the operating range A is $N_2$ or more ($A > N_1$, or $A > N_2$). In view of this, the machine tools $M_1$, $M_2$ are configured to process, not only the top surface of the workpiece W in FIG. 4, but a side surface of the workpiece W in a state where the trunnion unit 3 is turned by 90 degrees about the B-axis (see FIGS. 1A and 1B). Furthermore, by sequentially turning and indexing the table 10 about the C-axis (see FIGS. 1A and 1B) by 90 degrees, all of the four side surfaces can be processed. Accordingly, an operating range D of the trunnion unit 3 in the X-axis direction, which is a horizontal direction, is preferred to be equal to or more than a distance from the top surface of the table 10 to the top surface of the workpiece W. When the workpiece W is directly placed on the table 10, the operating range D is preferred to be equal to or more than a height H of the workpiece W. When the jig 15 is interposed, the operating range D is preferred to be equal to or more than a sum of a height G of the jig 15 and the height H of the workpiece W.

Next, in order to deliver the workpiece W, the machine is simply constituted and arranged such that a sum of "a distance $N_1$," and "a distance $N_2$–the height H of the workpiece W" is equal to or less than "a distance L" (that is, $L \leq N_1 + N_2 - H$). "The distance $N_1$ is from a rotational center of the B-axis, which is the rotation axis when the cradle 16 is turned to a side of the machine tool $M_2$ in the machine tool $M_1$ serving as a delivering side, to the top surface of the workpiece." "The distance $N_2$ is from the rotational center of the B-axis to the top surface of the table 10 or the jig 15 (since the machine tool $M_2$ serving as a receiving side is in a state without the workpiece W)." "The distance L is between a B-axis center position when the trunnion unit 3 of the machine tool $M_1$ is positioned at a right end and a B-axis center position when the trunnion unit 3 of the machine tool $M_2$ is positioned at a left end."

At this time, the distances $N_1$, $N_2$, which are from the B-axis centers to the top surface of the workpiece W, are sums of distances J from the B-axis centers to the top surfaces of the tables 10, the thicknesses $G_1$, $G_2$ of the jigs 15, and the height H of the workpiece W. Therefore, as illustrated in FIG. 5, it is considered that $L \leq G_1 + G_2 + H + 2J$. That is, basically, it is preferred to design the machine tool such that the distance J from the B-axis center to the top surface of the table 10 is positive and a large value (that is, a state illustrated in FIG. 4) and the table 10 is disposed as upward as possible with respect to the B-axis center. However, the machine tool system may be configured to deliver the workpiece W by adjusting the thicknesses $G_1$, $G_2$ of the jigs 15 depending on the distances J from the B-axis centers of the machine tool $M_1$, $M_2$ serving as the bases to the top surfaces of the tables 10 or a size of the height H of the workpiece W.

In addition, it is preferred to design the machine tools $M_1$, $M_2$ such that a sum of "a distance F," "a distance E," and "a distance K between the machines of the machine tools $M_1$, $M_2$" is equal to or less than "the distance L" (that is, F+E+K≤L) or to adjust a size and a position of the cover and the door arranged between the machine tools $M_1$, $M_2$ to fulfill the condition. "The distance F is from a B-axis center position of an operation end position in the right direction on the X-axis of the trunnion unit 3 of the machine tool $M_1$ serving as the base to the right end of the machine." "The distance E is from a B-axis center position of an operation end position in the left direction on the X-axis of the trunnion unit 3 of the machine tool $M_2$ to the left end of the machine." "The distance K between the machines of the machine tools $M_1$, $M_2$ is generated by, for example, the cover and the door arranged between the machine tools $M_1$, $M_2$." "The distance L is between the B-axis center position when the trunnion unit 3 of the machine tool $M_1$ is positioned at the right end and the B-axis center position when the trunnion unit 3 of the machine tool $M_2$ is positioned at the left end." However, the machine tool system may be configured to deliver the workpiece W while using existing machine tools or considering dimensions of the cover and similar component arranged between the machines by adjusting the thicknesses $G_1$, $G_2$ of the jigs 15 similarly to a case of the distances J from the B-axis centers to the top surfaces of the tables 10. For example, in a case of the configuration like FIG. 4, the workpiece W can be delivered even when the height H of the workpiece W is smaller than that in FIG. 4 as illustrated in FIG. 5. In the machine tools $M_1$, $M_2$ in FIGS. 4 and 5, when the workpiece W is delivered, any one of the trunnion units 3 of the machine tools $M_1$, $M_2$ may be moved in a direction separating from the other. Alternatively, it is possible to make the distance K between the machines large and dispose the cover and similar component in between.

As described above, the machine tool M includes the trunnion unit 3 movable in the right-left direction. The trunnion unit 3 is to hold the table 10 on which the workpiece W is placed rotatably using the rotation axis along the front-rear direction as the center. Such a machine tool M can shorten a stroke that causes the workpiece loading and unloading devices 12a, 12b to access to the table 10, which is for placing the workpiece W on, thereby ensuring changing the workpiece W in a considerably short period of time. Like the machine tool system $S_2$, by laterally arranging similar machine tools M, M . . . , the workpiece W can be delivered between the adjacent machine tools M, M. Therefore, the steps can be divided by the machine tools M, M . . . , thereby ensuring shortening a processing period per one step. Moreover, with the machine tool M, the workpiece W is inverted in a short period of time to ensure easily performing processing on the installation surface of the workpiece W with the table 10.

The machine tool system $S_1$ includes the workpiece loading and unloading devices 12a, 12b that is configured to deliver the workpiece W to the table 10 and receive the workpiece W from the table 10 in the right and left of the machine tool M as described above. With such a machine tool system $S_1$, by causing the workpiece loading and unloading devices 12a, 12b to simultaneously access from the right and left of the machine tool M, the workpiece W can be changed in an extremely short period of time, thereby ensuring substantially shortening a processing period of the workpiece W.

The configuration of the machine tool according to the disclosure is not limited to the form of the above-described embodiment, and the configuration of, such as the shape of the bed, the column, the saddle, the trunnion unit, the table, and similar part can be appropriately changed as necessary without departing from the spirit of the disclosure. The configuration of the machine tool system according to the disclosure is not limited to the form of the above-described embodiment, and the configuration, such as the shape and the structure of the cover and the workpiece loading and unloading device, can be appropriately changed as necessary without departing from the spirit of the disclosure.

Figure 6A:
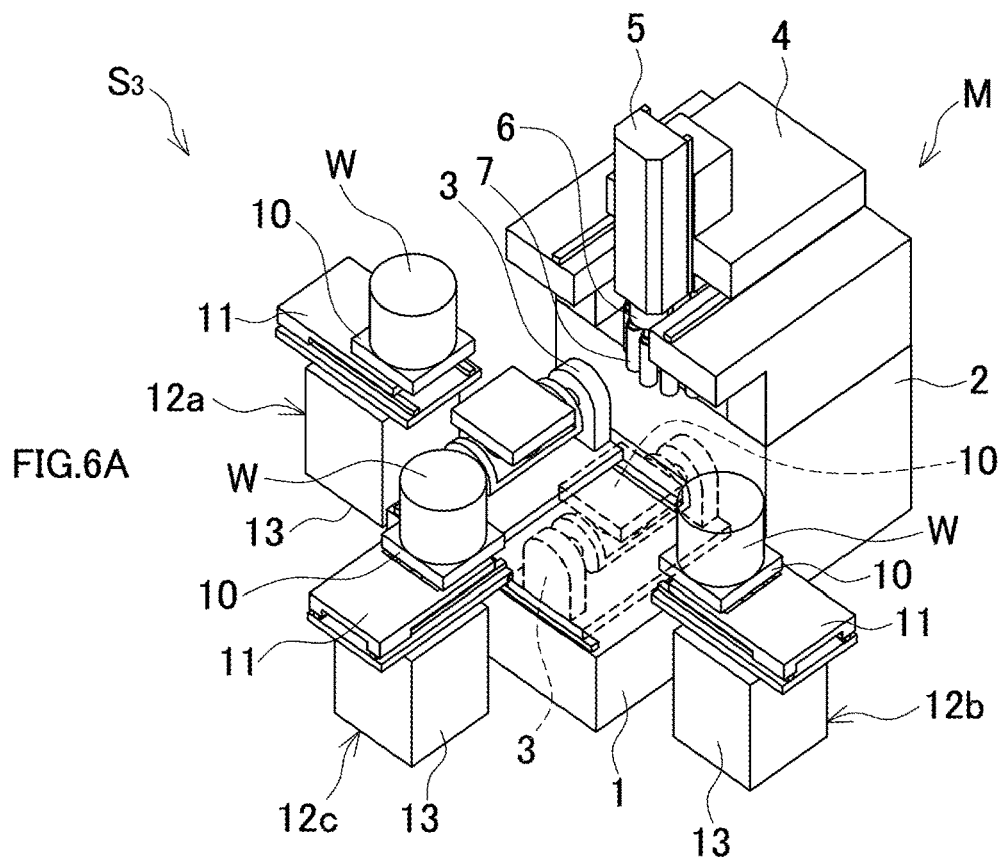
FIGS. 6A and 6B are explanatory views illustrating a modification example of the machine tool system (FIG. 6A is a perspective view and FIG. 6B is a plan view).
Figure 6B:
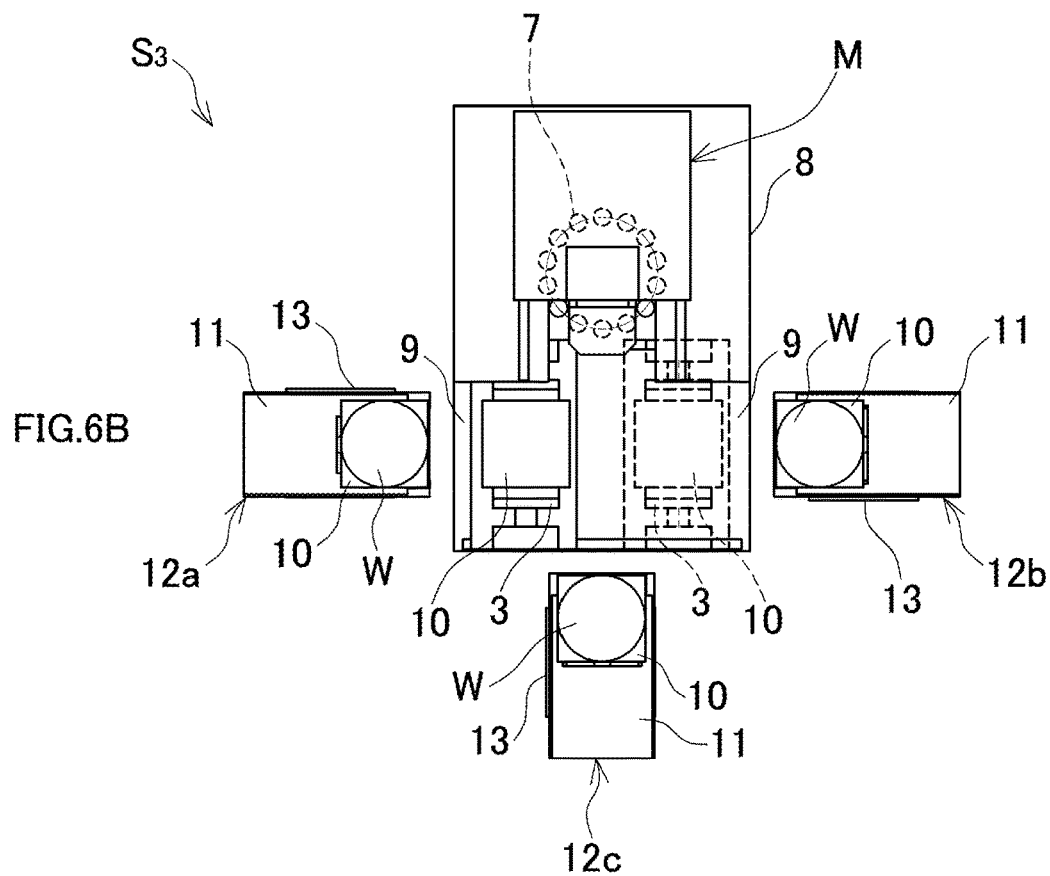

For example, the machine tool according to the disclosure is not limited to the machine tool that includes the tool changer with the clipper-type magazine like the above-described embodiment, but may be, for example, the machine tool that includes a tool changer including an arm unit with a pot rotating type ATC (automatic tool changer) in a side of the column or similar position. Meanwhile, the machine tool system according to the disclosure is not limited to dispose the workpiece loading and unloading device only on both the right and left sides of the cover like the above-described embodiment, but the machine tool system may install the workpiece loading and unloading device on both the right and left sides and the front of the cover as illustrated in FIGS. 6A and 6B or the machine tool system may include the workpiece loading and unloading device on one-side of the right and left and the front of the cover. As illustrated in FIGS. 6A and 6B, a machine tool system $S_3$ includes workpiece loading and unloading devices 12a, 12b, 12c that are installed on both the right and left sides and the front of the cover 8. In the machine tool system $S_3$, the workpiece W can be received and delivered from the right-left direction to the front, from the front to the right-left direction, and similar direction in a short period of time. Therefore, there is an advantage of a further high degree of freedom in a way to process the workpiece W.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A machine tool system comprising:
   at least first and second machine tools, each of the first and second machine tools comprising:
   a respective right side and a respective left side,
   a base;
   a table installed on the base;
   a column having at least a front surface, a height extending in an up-down direction, and a width extending in a right-left direction;
   a main spindle proximate the front surface of the column, to which a tool is mounted, the main spindle being caused to approach a workpiece on the table along the up-down direction; and
   a trunnion unit including a cradle rotatably holding the table on which the workpiece is placed, the cradle having a rotation axis that extends in a front-rear direction, and the trunnion unit being linearly movable in the right-left direction;
   wherein the rotation axis intersects the front surface of the column, and
   wherein the right-left direction and the front-rear direction extend perpendicular to one another;
   wherein the trunnion unit of the first machine tool is linearly movable in the right-left direction between a right position proximate the right side thereof and a left position proximate the left side thereof, and the trunnion unit of the second machine tool is linearly movable in the right-left direction between a left position proximate the left side thereof and a right position proximate the right side thereof, wherein a sum of a first distance between the right position of the trunnion unit of the first machine tool and the right side of the first machine tool, plus a second distance between the left position of the trunnion unit of the second machine tool and the left side of the second machine tool, plus a third distance between the right side of the first machine tool and the left side of the second machine tool, is less than or equal to a fourth distance between the trunnion unit of the first machine tool in the right position and the trunnion unit of the second machine tool in the left position, and when the trunnion unit of the first machine tool is in the associated right position and when the trunnion unit of the second machine tool is in the associated left position, the workpiece is able to be handed off from one of the trunnion unit of the first machine tool and the trunnion unit of the second machine tool to the other one of the trunnion unit of the first machine tool and the trunnion unit of the second machine tool.

2. The machine tool system according to claim 1, wherein the main spindle of at least one of the at least the first and second machine tools approaches the respective workpiece in a range, the range having a lower end below the center of the respective rotation axis of the respective trunnion unit and an upper end above a top surface of the respective workpiece.

3. The machine tool system according to claim 1, wherein the trunnion unit of at least one of the at least the first and second machine tools has a moving range in the right-left direction that exceeds a distance from a top surface of the respective table to a top surface of the respective workpiece.

4. The machine tool system according to claim 1, wherein at least one of the at least the first and second machine tools is configured such that in a state where the respective workpiece is positioned above the respective table, a top surface of the respective workpiece is above a center position of the respective rotation axis in the front-rear direction.

5. The machine tool system according to claim 1, wherein at least one of the at least the first and second machine tools is configured such that in a state where the respective workpiece is positioned above the respective table, a top surface of the respective table is configured to be above a center position of the respective rotation axis in the front-rear direction.

6. The machine tool system according to claim 1, wherein a sum of a distance from a center of the respective rotation axis of the at least the first machine tool to a top surface of the respective workpiece thereof and a distance from a center of the rotation axis of the at least the second machine tool to a top surface of the respective table thereof is configured so as to be equal to or less than a distance between the center of the respective rotation axis when the respective trunnion unit of the first machine tool is positioned at the respective right position and the center of the respective rotation axis when the respective trunnion unit of the second machine tool is positioned at the respective left position.

\* \* \* \* \*